(12) United States Patent
Charbit et al.

(10) Patent No.: US 9,113,448 B2
(45) Date of Patent: Aug. 18, 2015

(54) METHOD AND APPARATUS FOR ESTABLISHING A DEVICE-TO-DEVICE CONNECTION

(71) Applicant: Broadcom Corporation, Irvine, CA (US)

(72) Inventors: Gilles Charbit, Farnborough (GB); Chunyan Gao, Beijing (CN); Haiming Wang, Beijing (CN)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 13/956,713

(22) Filed: Aug. 1, 2013

(65) Prior Publication Data

US 2013/0316762 A1 Nov. 28, 2013

Related U.S. Application Data

(63) Continuation of application No. PCT/CN2011/071152, filed on Feb. 22, 2011.

(51) Int. Cl.
H04W 76/02 (2009.01)
(52) U.S. Cl.
CPC .................................. *H04W 76/023* (2013.01)
(58) Field of Classification Search
USPC ............... 455/410, 411, 416, 552.1; 370/329, 370/331, 338
See application file for complete search history.

(56) References Cited

U.S. PATENT DOCUMENTS

| 2008/0170552 | A1 | 7/2008 | Zaks | |
| 2009/0268652 | A1* | 10/2009 | Kneckt et al. | 370/311 |
| 2011/0201275 | A1* | 8/2011 | Jabara et al. | 455/41.2 |

FOREIGN PATENT DOCUMENTS

| CN | 1778073 A | 5/2006 |
| WO | WO 2009/133237 A1 | 11/2009 |

OTHER PUBLICATIONS

PCT International Search Report and Written Opinion mailed Nov. 24, 2011 issued in a related PCT International Application No. PCT/CN2011/071152 (5 pages).

\* cited by examiner

*Primary Examiner* — Sam Bhattacharya
(74) *Attorney, Agent, or Firm* — Foley & Lardner LLP; Christopher J. McKenna; Paul M. H. Pua

(57) ABSTRACT

A method, apparatus and computer program product are provided to facilitate the establishment of device-to-device communications, such as non-cellular communications or cellular communications in a licensed exempt band. A method and apparatus receive cellular signals including one or more beacon transmission parameters, such as a beacon transmission interval and an identifier, and a beacon transmission status flag. The method and apparatus may also determine that the beacon transmission status flag is set to authorize beacon transmissions and then cause non-cellular beacon signals to be repeatedly transmitted in accordance with the one or more beacon transmission parameters. The method and apparatus may also cause a device-to-device connection to be established following transmission of the beacon signals. The device-to-device connection may be either a non-cellular device-to-device connection or a cellular device-to-device connection.

23 Claims, 8 Drawing Sheets

METHOD AND APPARATUS FOR ESTABLISHING A DEVICE-TO-DEVICE CONNECTION

CROSS REFERENCE TO RELATED APPLICATION

This application is a Continuation of PCT International Patent Application No. PCT/CN2011/071152 filed on Feb. 22, 2011, the entire content of which is incorporated herein by reference.

TECHNOLOGICAL FIELD

Embodiments of the present invention relate generally to wireless communication technology and, more particularly, to a method, apparatus and computer program product for selectively establishing a device-to-device connection.

BACKGROUND

Mobile terminals routinely communicate within a licensed spectrum via networks supervised by various cellular operators. The licensed spectrum, however, has a finite capacity and may become somewhat scarce as the number of mobile terminals that are configured to communicate within the licensed spectrum increases at fairly dramatic rates. As the demands placed upon the licensed spectrum by the various mobile terminals begin to saturate the licensed spectrum, the mobile terminals may experience increasing levels of interference with the licensed spectrum potentially eventually becoming a bottleneck for such communications.

An increasing number of other network topologies are being integrated with cellular networks. These other network topologies include, for example, WiFi networks, ad hoc networks and various other local area networks. The terminals, either mobile or fixed, supported by these other network topologies may communicate with one another in an unlicensed spectrum, such as a licensed-exempt industrial scientific medical (ISM) radio band. The ISM radio band supports other non-cellular systems, such as Will systems operating in accordance with the IEEE 802.11 standard, ZigBee systems operating in accordance with the IEEE 802.15 standard, Bluetooth systems and universal serial bus (USE) wireless systems. In this regard, the ISM radio band may include the 2.4 GHz ISM band in which WiFi 802.11b and 802.11g systems operate and the 5 GHz ISM band in which WiFi 802.11a systems operate. Though cellular technologies have not generally been deployed in the ISM band, such deployment could be considered for local-area Long Term Evolution (LTE) cellular networks as long as they meet the regulatory requirements in country-specific ISM bands, e.g. Federal Communications Commission (FCC) in the United States. Another example of a license exempt band is TV White Space (TVWS), which has been investigated widely in the recent years due to the large available bandwidths at suitable frequencies for different radio applications. In the United States, the FCC has regulated licensed or license-exempt TV bands for the secondary-system applications, e.g., cellular, WiFi, WiMax, etc., on TV Band Devices (TVBD).

One example of the manner in which a mobile terminal may utilize a network other than the cellular network is provided by a dual-mode cellular terminal A dual-mode cellular terminal may utilize a cellular network and a non-cellular network, such as a WiFi network. Thus, a dual-mode cellular terminal may be configured to implement a WiFi-to-cellular handover and/or a cellular-to-WiFi handover. By way of example, a user may initially begin a voice over internet protocol (VoIP) call via a WiFi connection at the user's residence or office. This WiFi connection may be supported by a WiFi hotspot while the user remains within the building. As the user leaves the building, however, the call may be handed over from the WiFi connection to a cellular network. The handover process includes a number of sequential operations in order to effect the handover. In the foregoing example, the VOIP call may be initially set up via the WiFi network with the assistance of a session initiation protocol (SIP) client on the cellular terminal. Upon detecting that the WiFi signal has become weak, such as due to the departure of the user from the building or for any other reason, a handover may be initiated, in this regard, a cellular trans-receiver radio may be activated and the call may be set up in the cellular network. In this regard, registration and authentication may be established on the cellular network, along with a voice bearer path. A handover may then be made to the cellular network and the WiFi link may be dropped so as to complete the handover process. As evident from the foregoing example, a WiFi-to-cellular handover requires some level of integration in the application layer (such as the VoIP client), the control layer (such as an internet protocol (IP) multimedia system (IMS) core, a serving gateway, a mobility management entity (MME) or the like), the access layer (such as the public switched telephone network (PSTN), WiFi access point, cellular base station or the like) and the device (such as the WiFi modem and the cellular modem).

Another type of communication terminal that may operate in these other network topologies includes machines that are configured, for example, for wireless communications. In this regard, machines may be employed for various applications including for smart homes, smart metering, fleet management, remote healthcare, access network operation management, etc. These machines may communicate in accordance with machine type communications (MTC), also referred to as machine-to-machine (M2M) communications. In this regard, the local communication directly between machines may include M2M communication, communication in a cluster of machines, communication within a grid of local machines that each perform certain tasks and advanced machines acting as a gateway for a number of machines having lesser capabilities so as to facilitate network access for the machines and secondary usage of the cellular system spectrum.

BRIEF SUMMARY OF EXAMPLE EMBODIMENTS

A method, apparatus and computer program product are therefore provided in accordance with an example embodiment to facilitate the establishment of device-to-device communications, such as non-cellular communications or cellular communications in a license exempt band. By conducting at least some communications within the license exempt band, the resources of the licensed spectrum may be conserved. Moreover, by facilitating the establishment of device-to-device communications in an efficient manner, the method, apparatus and computer program product of an example embodiment to the present invention facilitate device-to-device communications without undesirably increasing the signaling load on a terminal, an access, point, a base station or other network entity. Among the device-to-device communication that may be facilitated by embodiments of the present invention is machine-to-machine communications that may further leverage communications within the license exempt band.

In one example embodiment, an apparatus is provided that includes processing circuitry configured at least to receive cellular signals including one or more beacon transmission parameters, such as a beacon transmission interval and an identifier, and a beacon transmission status flag. The processing circuitry may also be configured to determine that the beacon transmission status flag is set to authorize beacon transmissions. The processing circuitry may also be configured to cause non-cellular beacon signals to be repeatedly transmitted in accordance with the one or more beacon transmission parameters and in response to determining that the beacon transmission status flag is set to authorize beacon transmissions. For example, the processing circuitry may be configured to cause the beacon signals to be periodically transmitted in accordance with the beacon transmission interval. The processing circuitry may also be configured to cause a device-to-device connection to be established following transmission of the beacon signals, such as in response to a cellular signal that is received and that directs that the device-to-device connection be established. The device-to-device connection may be either a non-cellular device-to-device connection or a cellular device-to-device connection. For example, the device-to-device connection that is caused to be established may be a machine-to-machine connection that is caused to be established between a machine type communication (MTC) gateway and a MTC device.

In another example embodiment, a method is provided that includes receiving cellular signals including one or more beacon transmission parameters, such as a beacon transmission interval and an identifier, and a beacon transmission status flag. The method may also determine that the beacon transmission status flag is set to authorize beacon transmissions. The method may also cause non-cellular beacon signals to be repeatedly transmitted in accordance with the one or more beacon transmission parameters and in response to determining that the beacon transmission status flag is set to authorize beacon transmissions. For example, the method may cause the beacon signals to be periodically transmitted in accordance with the beacon transmission interval. The method may also cause a device-to-device connection to be established following transmission of the beacon signals, such as in response to a cellular signal that is received and that directs that the device-to-device connection be established. The device-to-device connection may be either a non-cellular device-to-device connection or a cellular device-to-device connection. For example, the device-to-device connection that is caused to be established may be a machine-to-machine connection that is caused to be established between a machine type communication (MTC) gateway and a MTC device.

In a further embodiment, a computer program product is provided that includes at least one computer-readable storage medium having computer-executable program code instructions stored therein with the computer-executable program code instructions including program code instructions for receiving cellular signals including one or more beacon transmission parameters, such as a beacon transmission interval and an identifier, and a beacon transmission status flag. The computer-executable program code instructions may also include program code instructions for determining that the beacon transmission status flag is set to authorize beacon transmissions. The computer-executable program code instructions may also include program code instructions for causing non-cellular beacon signals to be repeatedly transmitted in accordance with the one or more beacon transmission parameters and in response to determining that the beacon transmission status flag is set to authorize beacon transmissions. The computer-executable program code instructions may also include program code instructions for causing a device-to-device connection to be established following transmission of the beacon signals, such as in response to a cellular signal that is received and that directs that the device-to-device connection be established.

In yet another example embodiment, an apparatus is provided that includes means for receiving cellular signals including one or more beacon transmission parameters, such as a beacon transmission interval and an identifier, and a beacon transmission status flag. The apparatus may also include means for determining that the beacon transmission status flag is set to authorize beacon transmissions. The apparatus may also include means for causing non-cellular beacon signals to be repeatedly transmitted in accordance with the one or more beacon transmission parameters and in response to determining that the beacon transmission status flag is set to authorize beacon transmissions. The apparatus may also be include means for causing a device-to-device connection to be established following transmission of the beacon signals, such as in response to a cellular signal that is received and that directs that the device-to-device connection be established.

In one example embodiment, an apparatus is provided that includes processing circuitry configured at least to receive cellular signals including one or more beacon transmission parameters, such as a beacon transmission interval and an identifier, and a beacon measurement status flag. The processing circuitry may also be configured to determine that the beacon measurement status flag is set to authorize beacon measurements and to then receive one or more non-cellular beacon signals, such as in a periodic manner based upon the beacon transmission interval. The processing circuitry may also be configured to cause a cellular signal to be provided based upon a power level of the one or more non-cellular beacon signals, such as in response to a cellular signal requesting the provision of information regarding the power level of the beacon signals. For example, the processing circuitry may be configured to cause a cellular signal to be provided that includes one or more of an identity of a first terminal providing the non-cellular beacon signals, a power level of the non-cellular beacon signals or a link quality of the non-cellular beacon signals. The processing circuitry may also be configured to cause a device-to-device connection to be established following provision of the cellular signal based upon the power level of the beacon signals, such as in response to a cellular signal directing the establishment of the device-to-device connection. The device-to-device connection may be either a non-cellular device-to-device connection or a cellular device-to-device connection. For example, the de-vice-to-device connection that is caused to be established may be a machine-to-machine connection that is caused to be established between a machine type communication (MTC) gateway and a MTC device.

In another example embodiment, a method is provided that receives cellular signals including one or more beacon transmission parameters, such as a beacon transmission interval and an identifier, and a beacon measurement status flag. The method may also include determining that the beacon measurement status flag is set to authorize beacon measurements and then receiving one or more non-cellular beacon signals, such as in a periodic manner based upon the beacon transmission interval. The method may also include causing a cellular signal to be provided based upon a power level of the one or more non-cellular beacon signals, such as in response to a cellular signal requesting the provision of information regarding the power level of the beacon signals. For example, the method may cause a cellular signal to be provided that includes one or more of an identity of a first terminal providing the non-cellular beacon signals, a power level of the non-cellular beacon signals or a link quality of the non-cellular beacon signals. The method may also include causing a device-to-device connection to be established following provision of the cellular signal based upon the power level of the beacon signals, such as in response to a cellular signal directing the establishment of the device-to-device connection. The device-to-device connection may be either a non-cellular device-to-device connection or a cellular device-to-device connection. For example, the device-to-device connection that is caused to be established may be a machine-to-machine connection that is caused to be established between a machine type communication (MTC) gateway and a MTC device.

In a further example embodiment, a computer program product is provided that includes at least one computer-readable storage medium having computer-executable program code instructions stored therein with the computer-executable program code instructions including program code instructions for receiving cellular signals including one or more beacon transmission parameters, such as a beacon transmission interval and an identifier, and a beacon measurement status flag. The computer-executable program code instructions may also include program code instructions for determining that the beacon measurement status flag is set to authorize beacon measurements and program code instructions for then receiving one or more non-cellular beacon signals, such as in a periodic manner based upon the beacon transmission interval. The computer-executable program code instructions may also include program code instructions for causing a cellular signal to be provided based upon a power level of the one or more non-cellular beacon signals, such as in response to a cellular signal requesting the provision of information regarding the power level of the beacon signals. The computer-executable program code instructions may also include program code instructions for causing a device-to-device connection to be established following provision of the cellular signal based upon the power level of the beacon signals, such as in response to a cellular signal directing the establishment of the device-to-device connection.

In yet another example embodiment, an apparatus is provided that includes means for receiving cellular signals including one or more beacon transmission parameters, such as a beacon transmission interval and an identifier, and a beacon measurement status flag. The apparatus may also include means for determining that the beacon measurement status flag is set to authorize beacon measurements and means for then receiving one or more non-cellular beacon signals, such as in a periodic manner based upon the beacon transmission interval. The apparatus may also include means for causing a cellular signal to be provided based upon a power level of the one or more non-cellular beacon signals, such as in response to a cellular signal requesting the provision of information regarding the power level of the beacon signals. The apparatus may also include means for causing a device-to-device connection to be established following provision of the cellular signal based upon the power level of the beacon signals, such as in response to a cellular signal directing the establishment of the device-to-device connection.

In one example embodiment, an apparatus is provided that includes processing circuitry configured to cause one or more beacon transmission parameters, such as a beacon transmission interval and an identifier of a respective first terminal, and a beacon transmission status flag to be provided to one or more first terminals. The processing circuitry may also be configured to cause one or more beacon transmission parameters, such as a beacon transmission interval and an identifier of a respective first terminal, and a beacon measurement status flag to be provided to one or more second terminals. In one embodiment, the processing circuitry may be configured to introduce a predefined delay between causing the beacon transmission status flag to be provided to the one or more first terminals and causing the beacon measurement status flag to be provided to the one or more second terminals. The processing circuitry may also be configured to receive a signal based upon the power level of beacon signals transmitted between the one or more first terminals and a respective second terminal, such as in response to a request that is caused to be issued by the processing circuitry following, for example, a predefined delay following the provision of the beacon measurement status flag to the one or more second terminals. The processing circuitry may also be configured to direct a device-to-device connection to be established between a respective first terminal and the respective second terminal based upon the power level of the beacon signals. The device-to-device connection may be either a non-cellular device-to-device connection or a cellular device-to-device connection.

In another example embodiment, a method is provided that includes causing one or more beacon transmission parameters, such as a beacon transmission interval and an identifier of a respective first terminal, and a beacon transmission status flag to be provided to one or more first terminals. The method may also include causing one or more beacon transmission parameters, such as a beacon transmission interval and an identifier of a respective first terminal, and a beacon measurement status flag to be provided to one or more second terminals. The method may also include receiving a signal based upon the power level of beacon signals transmitted between the one or more first terminals and a respective second terminal. The method may also include directing a device-to-device connection to be established between a respective first terminal and the respective second terminal based upon the power level of the beacon signals.

In a further example embodiment, a computer program product is provided that includes at least one computer-readable storage medium having computer-executable program code instructions stored therein with the computer-executable program code instructions including program code instructions for causing one or more beacon transmission parameters, such as a beacon transmission interval and an identifier of a respective first terminal, and a beacon transmission status flag to be provided to one or more first terminals. The computer-executable program code instructions may also include program code instructions for causing one or more beacon transmission parameters, such as a beacon transmission interval and an identifier of a respective first terminal, and a beacon measurement status flag to be provided to one or more second terminals. The computer-executable program code instructions may also include program code instructions for receiving a signal based upon the power level of beacon signals transmitted between the one or more first terminals and a respective second terminal. The computer-executable program code instructions may also include program code instructions for directing a device-to-device connection to be established between a respective first terminal and the respective second terminal based upon the power level of the beacon signals.

In yet another example embodiment, an apparatus is provided that includes means for causing one or more beacon transmission parameters, such as a beacon transmission interval and an identifier of a respective first terminal, and a beacon transmission status flag to be provided to one or more first terminals. The apparatus may also include means for causing one or more beacon transmission parameters, such as a beacon transmission interval and an identifier of a respective first terminal, and a beacon measurement status flag to be provided to one or more second terminals. The apparatus may also include means for receiving a signal based upon the power level of beacon signals transmitted between the one or more first terminals and a respective second terminal. The apparatus may also include directing a device-to-device connection to be established between a respective first terminal and the respective second terminal based upon the power level of the beacon signals.

BRIEF DESCRIPTION OF THE SEVERAL VIEWS OF THE DRAWINGS

Figure 1:
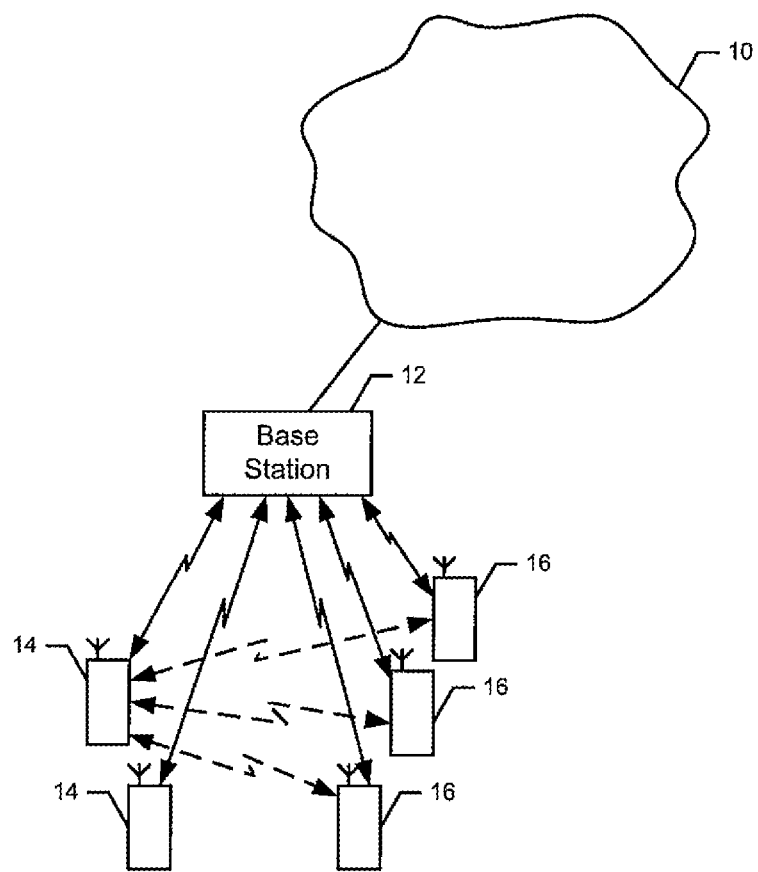
Figure 2:
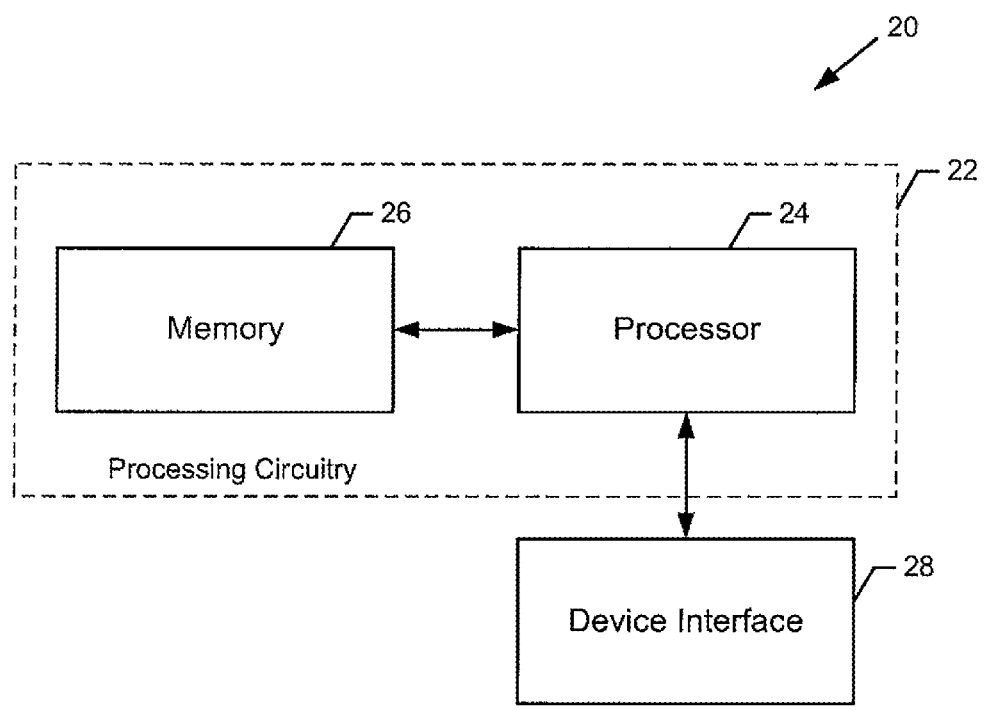
Figure 3:
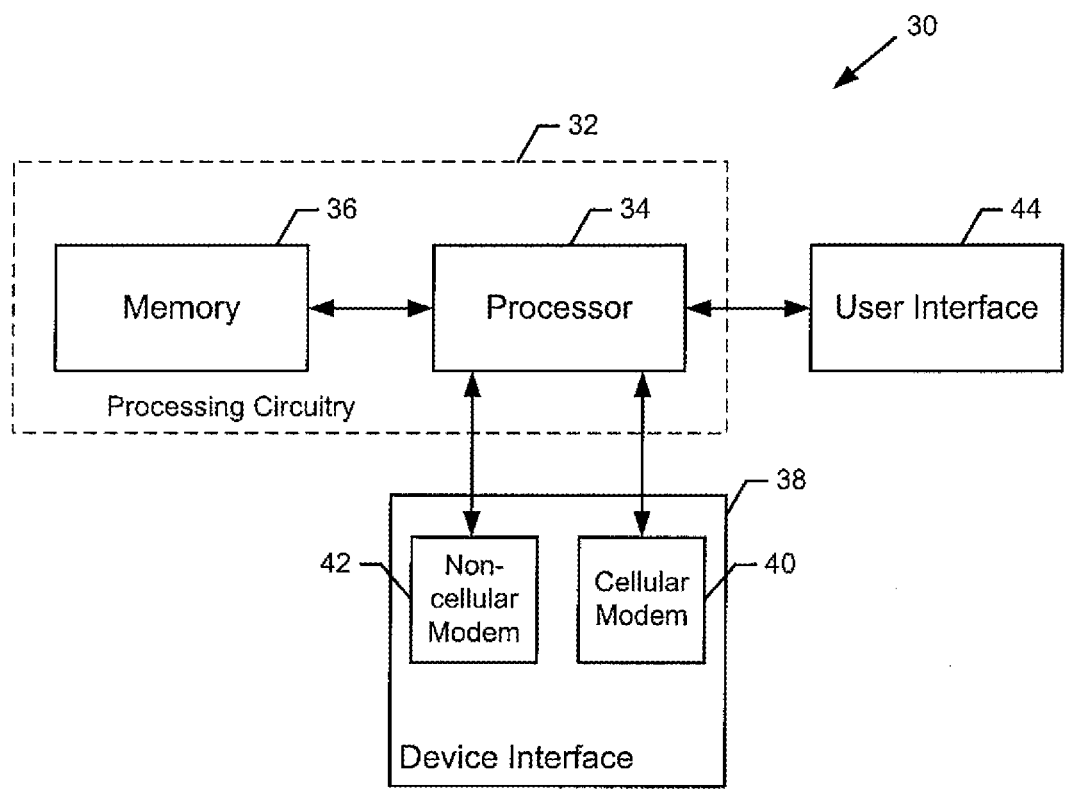
Figure 4:
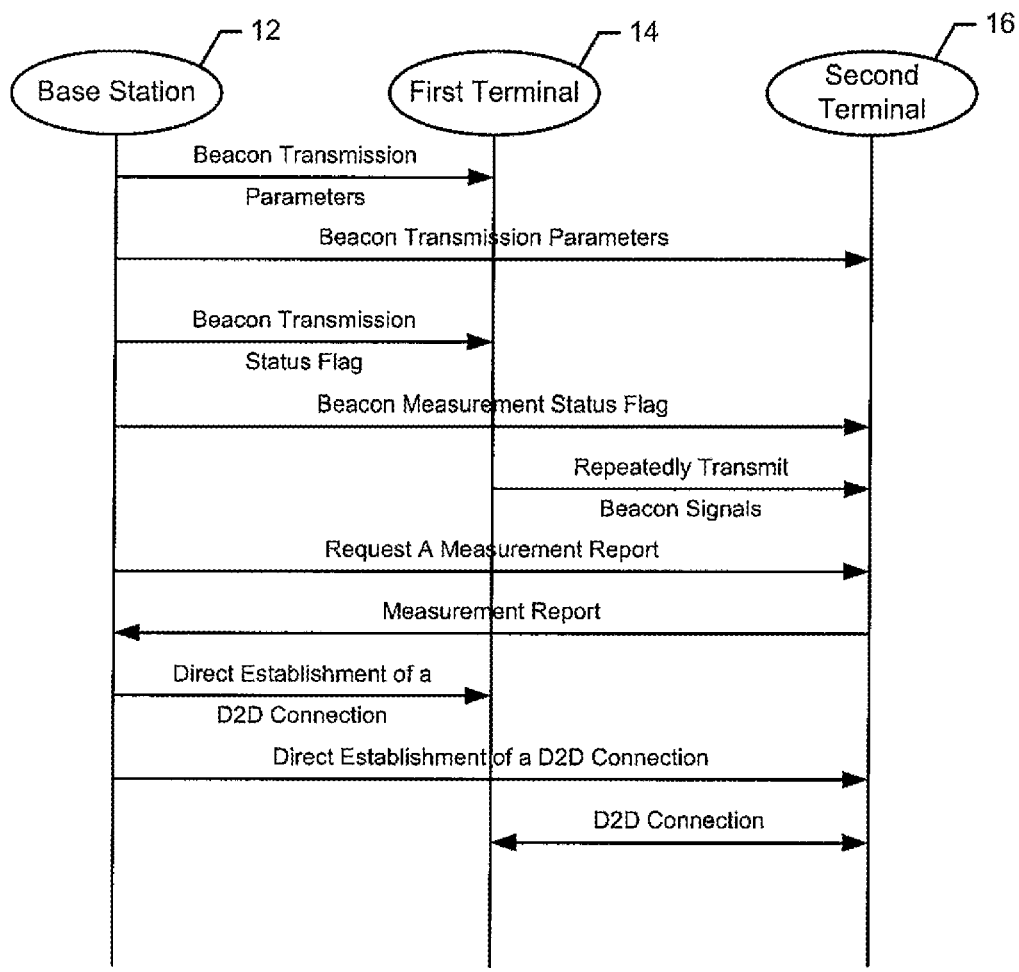
Figure 5:
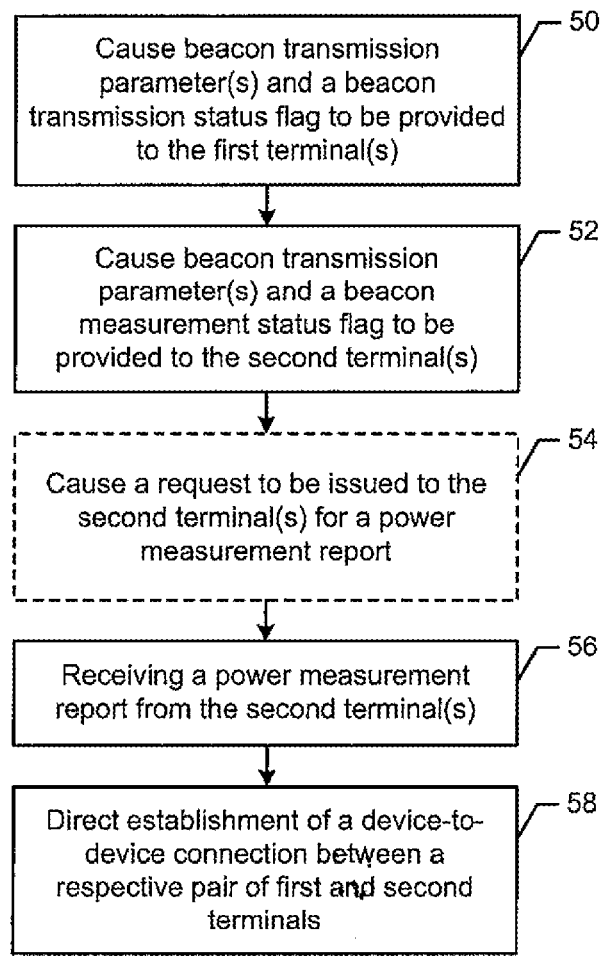
Figure 6:
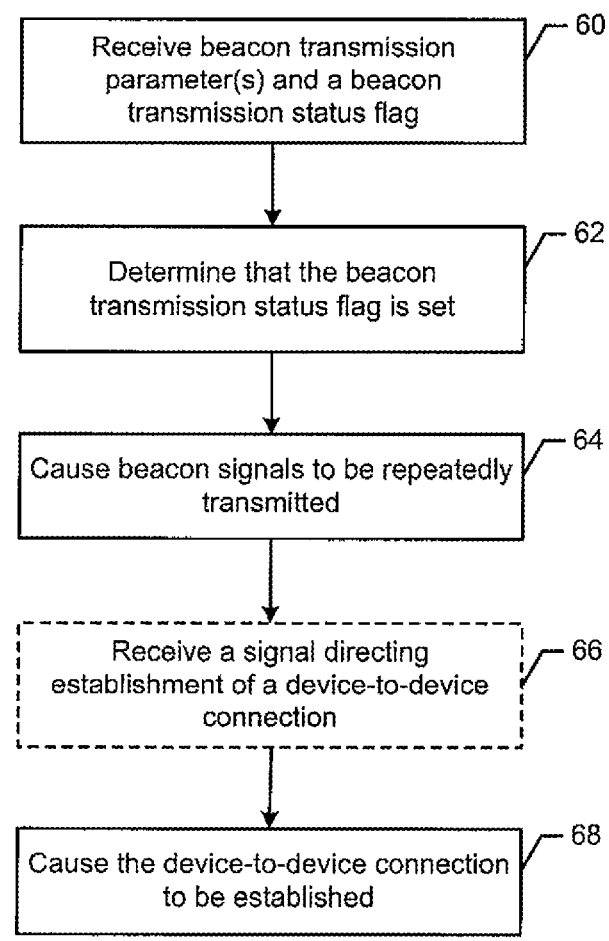
Figure 7:
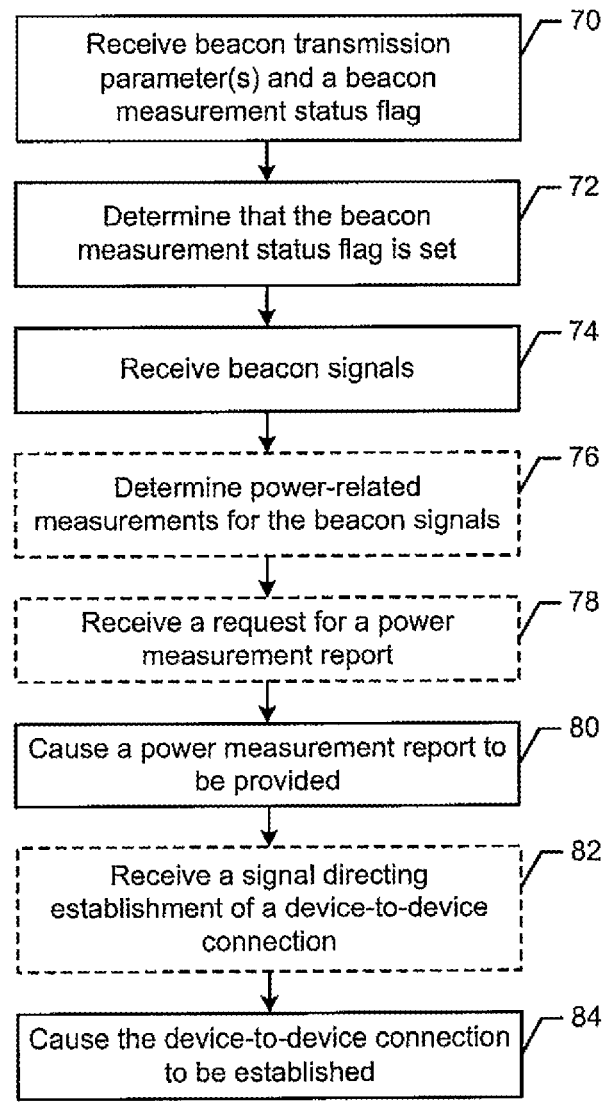
Figure 8:
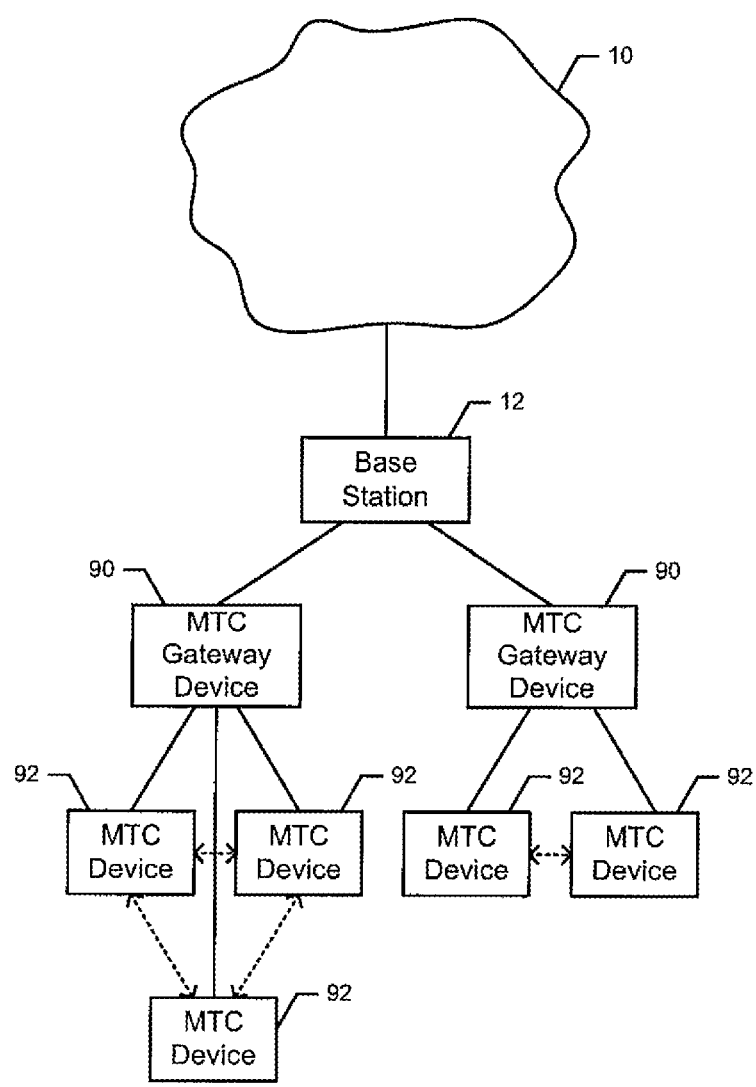

Having thus described embodiments of the invention in general terms, reference will now be made to the accompanying drawings, which are not necessarily drawn to scale, and wherein:

FIG. 1 is one example of a communications system according to an embodiment of the present invention;

FIG. 2 is a block diagram of an apparatus from the perspective of a base station in accordance with an example embodiment of the present invention;

FIG. 3 is a block diagram of an apparatus from the perspective of a terminal in accordance with an example embodiment of the present invention;

FIG. 4 is a signaling diagram illustrating messages exchanged between a base station, a first terminal and a second terminal in accordance with an example embodiment of the present invention;

FIG. 5 is a flowchart illustrating operations performed in accordance with an example embodiment of the present invention from the perspective of a base station;

FIG. 6 is a flowchart illustrating operations performed in a in accordance with an example embodiment of the present invention from the perspective of a first terminal that is configured to function as a beacon transmitter;

FIG. 7 is a flowchart illustrating operations performed in a in accordance with an example embodiment of the present invention from the perspective of a second terminal configured to function as a receiver and measurement device; and FIG. 8 illustrates another example of a communication system according to an embodiment of the present invention that provides for machine type communications.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

In accordance with an example embodiment of the present invention, a communication system is provided in which a network entity, such as an access point, a base station, an eNB or the like, may communicate with a plurality of terminals in the licensed spectrum in order to coordinate device-to-device communication between the terminals in a license exempt band, such as within the ISM band or the TVWS band. While a communications system that provides coordination of device-to-device communication may be configured in various different manners, FIG. 1 illustrates a generic system diagram in which a terminal, such as a mobile terminal, may communicate in a licensed spectrum with the network 10, such as by the exchange of cellular signals as shown in the solid lightening bolts in FIG. 1, and in a license exempt band, such as, but not limited to, the ISM band, with other terminals as shown in the dashed lightening bolts. As shown in FIG. 1, an embodiment of a system in accordance with an example embodiment of the present invention may include a set of first terminals 14 and a set of second terminals 16 that may each be capable of communication, such as cellular communication, in the licensed band with a network 10 (e.g., a core network) and more directly with one another in a license exempt band. While each set of the first and second terminals is shown to include multiple terminals, either set or both sets may include a single terminal in other embodiments. While the network may be configured in accordance with Long Term Evolution (LTE), the network may employ other mobile access mechanisms such as wideband code division multiple access (W-CDMA), CDMA2000, global system for mobile communications (GSM), general packet radio service (GPRS), LTE-Advanced ATE-A) and/or the like.

The network 10 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network. One or more communication terminals such as the first terminals 14 and second terminals 16 may be in communication with each other or other devices via the network. In some cases, each of the communication terminals may include an antenna or antennas for transmitting signals to and for receiving signals from an access point, base station, node B, evolved node B (eNB) or the like (hereinafter generically referenced as a base station 12). The base station could be, for example, part of one or more cellular or mobile networks or public land mobile networks (PLMNs). In turn, other devices such as processing devices (e.g., personal computers, server computers or the like) may be coupled to the terminals via the network.

In some example embodiments, the first and second terminal 14, 16 may be mobile communication devices such as, for example, a mobile telephone, portable digital assistant (PDA), pager, laptop computer, or any of numerous other hand held or portable communication devices, computation devices, content generation devices, content consumption devices, or combinations thereof. Alternatively, the first and second terminals may be fixed communication devices that are not configured to be mobile or portable. In either instance, the terminals may include one or more processors that may define processing circuitry either alone or in combination with one or more memories. The processing circuitry may utilize instructions stored in the memory to cause the terminals to operate in a particular way or execute specific functionality when the instructions are executed by the one or more processors. The terminals may also include communication circuitry and corresponding hardware/software to enable communication with other devices and/or the network 10.

The base station 12 may be embodied as or otherwise include an apparatus 20 as generically represented by the block diagram of FIG. 2. In this regard, the apparatus may be configured to communicate with the sets of first and second terminals 14, 16 to selectively establish device-to-device communication. While one embodiment of the apparatus is illustrated and described below, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with processing circuitry 22 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may include one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in sonic cases, a chip or chipset may constitute means for performing one or more operations for providing the functionalities described herein.

In an example embodiment, the processing circuitry 22 may include a processor 24 and memory 26 that may be in communication with or otherwise control a device interface 28. As such, the processing circuitry may be embodied as a circuit chip (e.g., an integrated circuit chip) configured (e.g., with hardware, software or a combination of hardware and software) to perform operations described herein in relation to the base station 12.

The device interface 28 may include one or more interface mechanisms for enabling communication with other devices, such as the sets of first and second terminals 14, 16, and/or networks, such as network 10. In some cases, the device interface may be any means such as a device or circuitry embodied in either hardware, or a combination of hardware and software that is configured to receive and/or transmit data from/to a network and/or any other device or module in communication with the processing circuitry 22. In this regard, the device interface may include, for example, an antenna (or multiple antennas) and supporting hardware and/or software for enabling communications with a wireless communication network and/or a communication modem, such as a cellular modem, for enabling communications with the sets of first and second terminals.

In an example embodiment, the memory 26 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or Alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

In one embodiment, the first and/or second terminals 14, 16 may be embodied as or otherwise include an apparatus 30 as generically represented by the block diagram of FIG. 3. In this regard, the apparatus may be configured to provide for communications in the licensed spectrum, such as cellular communications, with the base station 12 or another terminal and device-to-device communications in the license exempt band, such as non-cellular communications, with another terminal. While the apparatus may be employed, for example, by a mobile terminal, it should be noted that the components, devices or elements described below may not be mandatory and thus some may be omitted in certain embodiments. Additionally, some embodiments may include further or different components, devices or elements beyond those shown and described herein.

As shown in FIG. 3, the apparatus 30 may include or otherwise be in communication with processing circuitry 32 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may include one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 32 may include a processor 34 and memory 36 that may be in communication with or otherwise control a device interface 38 and, in some cases, a user interface 44. As such, the processing circuitry may be embodied as a circuit chip (e.g., an integrated circuit chip) configured (e.g., with hardware, software or a combination of hardware and software) to perform operations described herein. However, in some embodiments taken in the context of the mobile terminal 10, the processing circuitry may be embodied as a portion of a mobile computing device or other mobile terminal.

The user interface 44 (if implemented) may be in communication with the processing circuitry 32 to receive an indication of a user input at the user interface and/or to provide an audible, visual, mechanical or other output to the user. As such, the user interface in the context of a mobile terminal may include, for example, a keyboard, a mouse, a joystick, a display, a touch screen, a microphone, a speaker, and/or other input/output mechanisms.

The device interface 38 may include one or more interface mechanisms for enabling communication with other devices and/or networks. In some cases, the device interface may be any means such as a device or circuitry embodied in either hardware, or a combination of hardware and software that is configured to receive and/or transmit data from/to a network and/or any other device or module in communication with the processing circuitry 32. In this regard, the device interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In the illustrated embodiment, for example, the device interface includes a cellular modem 40 for supporting communications in the licensed spectrum, such as communications with the base station 12, and a non-cellular modem 42 for supporting communications in the license exempt band, such as non-cellular communications, e.g., communications in the ISM band or the TVWS band, with other terminals.

In an example embodiment, the memory 36 may include one or more non-transitory memory devices such as, for example, volatile and/or non-volatile memory that may be either fixed or removable. The memory may be configured to store information, data, applications, instructions or the like for enabling the apparatus 30 to carry out various functions in accordance with example embodiments of the present invention. For example, the memory could be configured to buffer input data for processing by the processor 34. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 34 may be embodied in a number of different ways. For example, the processor may be embodied as various processing means such as one or more of a microprocessor or other processing element, a coprocessor, a controller or various other computing or processing devices including integrated circuits such as, for example, an ASIC, an FPGA or the like. In an example embodiment, the processor may be configured to execute instructions stored in the memory 36 or otherwise accessible to the processor. As such, whether configured by hardware or by a combination of hardware and software, the processor may represent an entity (e.g., physically embodied in circuitry—in the form of processing circuitry 32) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

In order to establish device-to-device communications in accordance with an example embodiment of the present invention, the base station 12 may initially configure a set of first terminals 14 to function as non-cellular access points, such as a WiFi access points, within the license exempt band, such as the ISM band, and to repeatedly, such as periodically, transmit beacon signals. In this regard, the set of first terminals may include may include one or more terminals that are configured to serve as non-cellular access points in the manner described below. In order to configure the set of first terminals, the base station may provide beacon transmission parameters and a beacon transmission status flag to the set of first terminals. While various beacon transmission parameters may be provided, the base station of one embodiment may provide the beacon transmission intervals and the service set identifiers (SSIDs) to the set of first terminals, as shown in FIG. 4. The beacon transmission interval and the SSID may be specific or unique to each respective first terminal so as to permit the first terminals to be uniquely referenced to permit the signals transmitted by the first terminals to be distinguished. The base station may provide the beacon transmission parameters and the beacon transmission status flag to the first terminals via cellular signaling that may be received by the cellular modems 40 of the first terminals. The beacon transmission parameters and the beacon transmission status flag may then be stored, such as in memory 36.

In an embodiment in which the set of first terminals 14 includes a plurality of terminals, beacon transmission intervals may be established for the first terminals in such a manner as to eliminate, minimize or at least reduce the likelihood of interference between the beacon signals transmitted by the set of first terminals. In one embodiment, the base station 12 may provide different beacon transmission intervals to each of the first terminals. For example, the information that configures the first terminals to function as non-cellular access points may be provided in various manners. However, in one embodiment, the base station is configured to transmit and the set of first terminals are configured to receive the beacon transmission parameters in a beacon frame, such as defined in conjunction with IEEE 802.11 standard. In accordance with the IEEE 802.11 standard, the minimum beacon frame length is a sum of the physical layer convergence protocol (PLCP) preamble/header, the 24 byte medium access control (MAC) header, the 12 byte mandatory fixed-length fields and the SSID information elements which range from 0 to 32 bytes in the MAC frame body. The time required to transmit such a minimally sized beacon frame is dependent upon the version of the IEEE 802.11 standard that is utilized, but the minimum frame length for the IEEE 802.11a standard may be about 148 µs and for the IEEE 802.11b standard may be about 960 µs. In one example embodiment of the present invention, the beacon transmission interval may be provided in the fixed-length field of the beacon frame. For example, the beacon transmission interval may be provided as a 16-bit value that is provided in the fixed-length field of the beacon frame and is to be multiplied by a predefined time unit, such as 1024 µs, to define the beacon transmission interval.

By way of example, the beacon transmission interval may be nominally set to 100 time units or about 100 ms (about 0.1 sec) in an embodiment in which each time unit is 1024 µs. In an instance in which the set of first terminals 14 includes three mobile terminals designated UE1, UE2 and UE3, the base station 12 may assign different beacon transmission intervals to the first terminals with the beacon transmission intervals being designated T1, T2 and T3, respectively. In order to reduce the probability of interference between the beacon signals transmitted by the different first terminals, the base station may assign beacon transmission intervals that have different values, such as different prime number values that are relatively close to the nominal length of the beacon transmission interval. In an instance in which the nominal beacon transmission interval is 100 μs, the base station may assign beacon transmission intervals of 101 μs, 103 μs and 107 μs for T1, T2 and T3, respectively. Since the probability of interference between the beacon transmission signals of two of the first terminals is the inverse of the product of the beacon transmission intervals of the two first terminals, the probability of interference between the beacon transmission signals transmitted by any two of the first terminals in this example is about 0.01%. For example, the probability that the beacon transmission signal transmitted by UE1 will interfere with the beacons transmission signal transmitted by UE2 is 1/(101*103) and the probability that the beacon transmission signal transmitted by UE1 will interference with beacon transmission signal transmitted by UE3 is 1/(101*107).

Even smaller interference probabilities may be achieved by assigning larger beacon transmission intervals, such as larger prime number values, such as 499, 503 and 509. While increases in the beacon transmission interval will decrease the probability of interference between the beacon transmission signals, increases in the beacon transmission intervals also increase the requisite measurement time. For example, a second terminal 14 that receives a beacon transmission signal may need to receive several beacon transmission signals from the same first terminal 14 in order to synchronize to the first terminal that is transmitting the beacon transmission signals and to measure the power level of the beacon transmission signals with reasonable accuracy. By way of example, the beacon transmission interval may be 101 μs and ten beacon signals may need to be received by second terminal in order achieve synchronization and to obtain reliable measurements. In this embodiment, it would take about 1 second that is, 10*0.1 second, to obtain reliable measurements. However, if the beacon transmission interval were to increase to 503 μs, the corresponding probability of interference between beacon transmission signals is reduced, but the time required to obtain reliable measurements would increase to about 5 seconds, that is, 10*0.5 seconds. Thus, the selection of the beacon transmission interval may involve a tradeoff between the probability of interference between the beacon transmission signals and the time required to obtain reliable measurements.

In addition to defining the beacon transmission parameters, the base station 12 may provide a cellular signal causing a beacon transmission status flag within the memory 36 of the first terminals 14 to be set, thereby enabling the non-cellular, e.g., WiFi, modems 42 of the first terminals. In this regard, the base station may transmit signals to the set of first terminals via a cellular network or otherwise within the licensed spectrum that causes the beacon transmission status flag to be set in each of the first terminals.

The base station 12 may also initially configure a set of second terminals 16 to function as non-cellular stations within the license exempt band, such as the ISM band or the TVWS band, and to receive beacon signals from at least some of the set of first terminals 14 and to measure the power levels of the received beacon signals. In order to configure the set of second terminals, the base station may transmit cellular signals that provide at least some of the beacon transmission parameters, such as the identity, e.g. the SSID, of the first terminals and the beacon transmission intervals that will be utilized by the first terminals, as shown by FIG. 4. By identifying the set of first terminals, the set of second terminals may discriminate between beacon signals transmitted by the set of first terminals and other non-cellular access points, such as home WiFi access points or the like. The base station may also transmit cellular signals that provide the beacon measurement status flag to the set of second terminals, as also shown in FIG. 4. In one embodiment, the beacon transmission parameters and the beacon measurement status flag may be stored in memory 36 for future reference by the second terminals.

The base station 12 may transmit the beacon transmission status flag and the beacon measurement status flag to the sets of first and second terminals 14, 16, respectively, concurrent with the beacon transmission parameters. Alternatively, the base station may transmit the beacon transmission status flag and the beacon measurement status flag to the first and second terminals, respectively, at a different time than the beacon transmission parameters, such as following the beacon transmission parameters as shown in FIG. 4. Indeed, the mobile terminal may transmit the beacon measurement status flag to the second terminal following the transmission of the beacon transmission status flag, such as following a predefined delay $T_{setup}$.

Once the beacon transmission flag and the beacon measurement status flag have been set, the non-cellular beacon signals may be transmitted, received and measured in the license exempt band, such as in the ISM band or the TVWS band. As noted above, the base station 12 of one embodiment may introduce a delay of a predetermined time $T_{setup}$ following the provision of the beacon transmission status flag to the first terminals 14 prior to causing the beacon measurement status flag to be transmitted to the second terminals 16. The delay $T_{setup}$ that is introduced may correspond to the time required for signaling between the base station and the second terminals, such as to provide the beacon transmission parameters or, at least, the beacon measurement status flag to the second terminals and for the second terminals to read or otherwise respond to the beacon measurement status flag and to activate the non-cellular modems 42, such as the WiFi modems, of the first and second terminals. As such, the second terminals may be synchronized with the beacon transmissions so as to make appropriate measurements of the beacon transmissions in a timely fashion.

In this regard, the non-cellular modems 42 of the first and second terminals 14, 16 may monitor or read the respective status flags. Once the non-cellular modems of the first and second terminals determine that the respective status flag has been set, such as to authorize transmission or measurement of beacon signals, the non-cellular modems may read or otherwise obtain the beacon transmission parameters from memory 36 and then commence operations so to either transmit the beacon frames in accordance with the beacon transmission parameters by the first terminals, or receive and measure the beacon signals in accordance with the beacon transmission parameters by the second terminals. By appropriately setting the beacon transmission intervals for the first terminals in the manner described above, the probability of interference between the beacon signals transmitted by different ones of the first terminals may be reduced.

The second terminals 16 receive the beacon signals transmitted by at least some of the first terminals 14. The second terminals may determine the source of the beacon signals based upon the identifier, such as the SSID, associated with the beacon signals. Additionally, the second terminals may be configured to make measurements of the power levels of the beacon signal. Various power levels may be measured including the signal power level that may be measured directly from the beacon signals received by the second terminals and/or the link quality. In order to make a measurement of the link quality, a first terminal may provide access to a respective second terminal on a non-cellular channel, such as a WiFi channel, and may indicate that there are buffered frames to be transmitted. Following polling by the respective second terminal, the frames may be transmitted to the second terminal.

More particularly, a first terminal 14 may indicate to a second terminal 16 that the first terminal has buffered frames to be transmitted to the second terminal. This indication may be provided in a traffic information map (TIM) provided, for example, in the optional, variable length fields of a beacon frame. The second terminal and, in particular, the non-cellular modem 42, such as a WiFi modem, of the second terminal, may reserve a non-cellular channel, such as a WiFi channel, such as via a carrier sensing multiple access/collision avoidance (CSMA/CA) procedure. The second terminal may then cause a polling frame to be transmitted to the first terminal. Upon receipt of the polling frame, the first terminal may transmit data frames to the second terminal over the measurement interval. In addition, by re-using existing IEEE 802.11 protocols, the first terminal, such as a transmitter of the first terminal, may increase the data rates based on the success rate of the transmission, such as the ACK/NACK success rate. The link quality between the first and second terminals may be determined by the processing circuitry 32 of the second terminal based on the data rate supported by the link therebetween, that is, the amount of data successfully received within the measurement interval.

The link quality may be measured in various manners. For example, the foregoing description of a technique for determining link quality is an approximation as the foregoing technique does not include the WiFi MAC loss due to the backoff algorithm in an instance in which activity is detected during a backoff slot, that is, access to the WiFi channel is delayed which, in turn, has a negative impact on the data rates. However, the link quality between a respective pair of first and second terminals 14, 16 should provide at least an approximate indication of the link quality which, when combined with the signal power level of the respective pair of first and second terminals, may enable the base station 12 to make an informed decision on the eventual device-to-device connections between first and second terminals.

The second terminals 16 may then provide reports to the base station 12 regarding the power levels of the beacon signals from the respective ones of the first terminals 14. In one embodiment illustrated in FIG. 4, the base station may issue a request to the second terminals for the power measurement information. In order to provide sufficient time for synchronization and measurement of the beacon signals, the base station may wait a predefined period of time, such as $T_{D2Dmeas}$, after having caused the beacon measurement status flags to have been set by the second terminals. The second terminals may provide various types of power measurement reports regarding the beacon signals from the various first terminals. In this regard, a second terminal may cause a report to be issued to the base station that identifies the first terminals that provided beacon signals that were detected by the second terminal. In one embodiment, the power measurement report may identify the first terminals by their respective identifiers, such as SSIDs. The power measurement report provided by the second terminal may also include the received signal power level for the beacon signals provided by each of the first terminals from which beacon signals were detected.

Additionally, or alternatively, the second terminal may provide a measure of the link quality between the second terminal and each respective first terminal from which beacon signals were received based upon an effective data rate achieved for the non-cellular transmissions between the respective pair of first and second terminals. The power measurement report provided by the second terminal may also include the detected interference signal power level of other non-cellular access points or stations that are transmitting non-cellular signals, but which were not identified by the beacon transmission parameters to be a member of the set of first terminals. Further, if the geo-location of the second terminal is known, the power measurement report provided by the second terminal may also include a geo-location such that the base station can determine the non-cellular channels, such as the WiFi channels, that are free from interference at the particular geo-location.

Based upon the power measurement reports provided by the second terminals 16 which, in turn, are based upon the beacon signals provided by the first terminals 14, the base station 12 may determine the appropriate device-to-device connections to be established, such as in the license exempt band, e.g., in the ISM band or the TV WS band, between respective pairs of the first and second terminals. The base station may then cause instructions to be issued via cellular signals directed to the first and second terminals instructing respective pairs of the first and second terminals to establish a non-cellular device-to-device connection in the license exempt band or a cellular device-to-device connection in the license exempt band, or to avoid establishment of a device-to-device connection. In an instance in which the respective pair of first and second terminals receives an instruction from the base station to establish a non-cellular device-to-device connection there between, the first and second terminals may also utilize their respective non-cellular modems 42 to cause the device-to-device connection to be established such that subsequent communications between the respective pair of first and second terminals can be conducted via the device-to-device connection in the license exempt band, such as within the ISM band or the TVWS band, so as to avoid unnecessary utilization of loading of the licensed spectrum. In another instance in which the respective pair of first and second terminals receives an instruction from the base station to establish a cellular device-to-device connection there between, the first and second terminals may also utilize their respective cellular modems 40 to cause the device-to-device connection to be established such that subsequent communications between the respective pair of first and second terminals can be conducted via the cellular device-to-device connection in the licensed exempt band.

While an embodiment of the present invention has been described above in conjunction with FIG. 4, flowcharts of the operations performed from the perspective of the base station 12, a first terminal 14 and a second terminal 16 are now provided with reference to FIGS. 5-7, respectively. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures shown by the flowcharts may be embodied by computer program instructions. In this regard, the computer program instructions which embody the procedures depicted by the flowcharts may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

With reference to block 50 of FIG. 5, an apparatus 20 that may be embodied by or otherwise associated with a base station 12 may include means, such as processing circuitry 22, a processor 24, a device interface 28 or the like, for causing one or more beacon transmission parameters and a beacon transmission status flag to be provided to one or more first terminals 14. As noted above, the beacon transmission parameters may include a beacon transmission interval and an identifier of a respective first terminal. The apparatus may also include means, such as the processing circuitry, the processor, the device interface or the like, for causing one or more beacon transmission parameters and a beacon measurement status flag to be provided to one or more second terminals 16. See block 52. As noted above, the beacon transmission parameters may include a beacon transmission interval and an identifier of a respective first terminal. Additionally, the apparatus may introduce a predefined delay following the transmission of the beacon transmission status flag to the first terminals prior to causing the beacon measurement status flag to be provided to the second terminals.

Following the transmission and measurement of the beacon signals, the apparatus 20 may also include means, such as the processing circuitry 22, the processor 24, the device interface 28 or the like, for causing a request to be issued to one or more second terminals 16 to request the issuance of a power measurement report. See block 24. In one embodiment, the apparatus may introduce a predefined delay after having caused the beacon measurement status flag to be provided to the second terminals prior to causing a request for the power measurement report to be issued. The apparatus may also include means, such as the processing circuitry, the processor, the device interface or the like, for thereafter receiving a cellular signal based upon the power level of the beacon signals transmitted between one or more first terminals 14 and respective second terminals. See block 56. In other words, the apparatus may be configured to receive a power level measurement report from the respective second terminals. The apparatus may also include means, such as the processing circuitry, the processor, the device interface or the like, for directing a device-to-device connection, such as either a non-cellular device-to-device connection in the license exempt band or a cellular device-to-device connection in the licensed exempt band, to be established between the respective first and second terminal based upon the power levels of the beacon signals. See block 58.

From the perspective of a first terminal 14, an apparatus 30 is provided that may be embodied by or otherwise associated with a respective first terminal. The apparatus may include means, such as the processing circuitry 32, the processor 34, the device interface 38, the cellular modem 40 or the like, for receiving cellular signals, including one or more beacon transmission parameters and a beacon transmission status flag. See block 60 of FIG. 6. As noted above, the beacon transmission parameters may include a beacon transmission interval and an identifier of the respective first terminals. The apparatus may also include means, such as the processing circuitry, the processor, the device interface, the non-cellular modem 42 or the like, for determining that the beacon transmission status flag is set to authorize beacon transmissions. See block 52. For example, the non-cellular modem, such as a WiFi modem, of the first terminal may monitor a respective memory location that maintains the beacon transmission status flag such that the non-cellular modem may determine when the beacon transmission status flag has been set to authorize beacon transmissions.

In response to determining that the beacon transmission status flag has been set to authorize beacon transmissions, the apparatus 30 that is embodied by or associated with the first terminal 14 may includes means, such as the processing circuitry 32, the processor 34, the device interface 38, the non-cellular modem 42 or the like, for causing non-cellular beacon signals to be repeatedly transmitted, such as in a periodic manner, in accordance with one or more beacon transmissions parameters, such as the beacon transmission interval. See block 64 of FIG. 6. Thereafter, the apparatus may include means, such as the processing circuitry, the processor, the device interface, the cellular modem or the like, for receiving direction from the base station 12, such as via cellular signals provided by the base station, regarding the establishment of a device-to-device connection with the respective second terminal 16, such as either a non-cellular device-to-device connection in the license exempt baud or a cellular device-to-device connection in the licensed exempt band. See block 66. If a non-cellular device-to-device connection is to be established, the apparatus therefore also includes means, such as the processing circuitry, the processor, the device interface, the non-cellular modem or the like, for causing a non-cellular device-to-device connection to be established with the respective second terminal, such as in the license exempt band. Conversely, if a cellular device-to-device connection is to be established, the apparatus therefore also includes means, such as the processing circuitry, the processor, the device interface, the cellular modem 40 or the like, for causing a cellular device-to-device connection to be established with the respective second terminal, such as in the license exempt band. See block 68.

From the perspective of the second terminal 16, an apparatus 30 that may be embodied by or otherwise associated with a second terminal may include means, such as the processing circuitry 32, the processor 34, the device interface 38, the cellular modem 40 or the like, for receiving cellular signals including one or more beacon transmission parameters and a beacon measurement flag. See block 70 of FIG. 7. As noted above, the beacon transmission parameters may include the beacon transmission interval and an identifier of one or more first terminals 14 that are configured to transmit non-cellular signals. The apparatus may also include means, such as the processing circuitry, the processor, the device interface, the non-cellular modem 42, such as a WiFi modem, or the like, for determining that the measurement status flag is set to authorize beacon measurements. See block 72. In this regard, the non-cellular modem may monitor a memory location that maintains the beacon measurement status flag so as to determine when the beacon measurement status flag is set so as to authorize beacon measurements. Once beacon measurements are authorized, the apparatus may include means, such as the processing circuitry, the processor, the device interface, the non-cellular modem or the like, for receiving one or more non-cellular beacon signals from one or more first terminals. See block 74.

In addition to receiving the beacon signals, the apparatus 30 embodied by or associated with the second terminal 16 may include means, such as the processing circuitry 32, the processor 34 or the like, for determining a measure of the power level associated with the beacon signals from a respective first terminal 14. See block 76 of FIG. 7. As described above, the measure of the power level may have various forms, including the signal power level, link quality or the like. The apparatus may also include means, such as the processing circuitry, the processor, the device interface 38, the cellular modem 40 or the like, for receiving a cellular signal from a base station 12 that requests that the power level measurements be provided. See block 78. As such, the apparatus also includes means, such as the processing circuitry, the processor, the device interface, the cellular modem or the like, for causing a cellular signal to be provided to the base station based upon the power level of the one or more non-cellular beacon signals. See block 80. For example, the cellular signal that is provided based upon the power level of the non-cellular beacon signals may include an identity of a first terminal, the power level of the non-cellular beacon signals received from the first terminal, and/or the link quality of the non-cellular beacon signals received from the first terminal.

The apparatus 30 embodied by or associated with the second terminal 16 may also include means, such as the processing circuitry 32, the processor 34, the device interface 38, the cellular modem 40 or the like, for receiving an instruction, such as via cellular signals provided by the base station 12, directing the second terminal to establish a device-to-device connection with a respective first terminal 14 based upon the measured power levels of the beacon signals received by the second terminal. See block 82 of FIG. 7. If a non-cellular device-to-device connection is to be established, the second terminal may also include means, such as processing circuitry, the processor, the device interface, the non-cellular modem 42 or the like, for causing a non-cellular device-to-device connection to be established with the respective first terminal such that subsequent communications therebetween can be conducted via the device-to-device connection, such as within the license exempt band. Alternatively, if a cellular device-to-device connection is to be established, the second terminal may also include means, such as processing circuitry, the processor, the device interface, the cellular modem 40 or the like, for causing a cellular device-to-device connection to be established with the respective first terminal such that subsequent communications therebetween can be conducted via the device-to-device connection, such as within the licensed exempt band. See block 84.

In some embodiments, certain ones of the operations above may be modified or further amplified. For example, FIGS. 5-7 illustrate, by dashed lines, additional optional operations that may be included in some embodiments, but not other embodiments. It should be appreciated that each of these optional operations may be included with the other operations either alone or in combination with any others among the features described herein.

Although device-to-device connections may be established between a variety of different types of first and second terminals 14, 16, the first and second terminals of one embodiment may be a machine type communication (MTC) gateway 90 and an MTC device 92, each of which are configured to communicate in both the licensed spectrum, such as via respective cellular modems, and in the unlicensed spectrum, such as via respective non-cellular modems, such as WiFi modems. As shown in FIG. 8, a system in accordance with this embodiment may include a base station 12 that is in communication with one or more MTC gateways. Each MTC gateway may communicate with a plurality of MTC devices within a capillary network such as via non-cellular communications, e.g., ZigBee, Bluetooth, or communications in accordance with the IEEE 802.15 standard. The MTC gateway, however, not only can communicate with the MTC devices via local connectivity technologies such as non-cellular communications, but may also communicate with the network 10, such as the base station, via cellular connections. Thus, the MTC gateway device may serve as an agent for the MTC devices within the capillary network to communicate via the network. As such, the MTC gateway device may perform procedures such as authentication, authorization, registration, management and provisioning on behalf of the MTC devices within the respective capillary network.

In an instance in which at least one of the MTC devices 92 within a capillary network not only may communicate via non-cellular signals, such as via non-cellular modems, but also may communicate with cellular signals, such as via cellular modem, the respective MTC device and the MTC gateway device 90 may be considered a respective pair of first and second terminals 14, 16 and may be configured by the base station 12 to establish device-to-device communications, such as machine-to-machine communications, therebetween. For example, a non-cellular connection via WiFi may be established between the respective MTC device and the MTC gateway for such machine-to-machine communication, while other communications within the capillary network such as between the MTC gateway device and other MTC devices may be conducted via other non-cellular communication channels such as ZigBee. In another example, a cellular connection may be established between the respective MTC device and the MTC gateway for such machine-to-machine communication, while other communications within the capillary network such as between the MTC gateway device and other MTC devices may be conducted via other non-cellular communication channels such as WiFi or ZigBee. As such, the method, apparatus and computer program product of an example embodiment of the present invention may facilitate improvements with respect to machine-to-machine communications.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising processing circuitry configured at least to:
   receive cellular signals including one or more beacon transmission parameters and a beacon transmission status flag;
   determine that the beacon transmission status flag is set to authorize beacon transmissions;
   cause non-cellular beacon signals to be repeatedly transmitted in accordance with the one or more beacon transmission parameters and in response to determining that the beacon transmission status flag is set to authorize beacon transmissions; and
   cause a device-to-device connection to be established following transmission of the beacon signals.

2. The apparatus according to claim 1 wherein the processing circuitry being configured to receive the beacon transmission parameters comprises being configured to receive a beacon transmission interval and an identifier.

3. The apparatus according to claim 2 wherein the processing circuitry being configured to cause the beacon signals to be repeatedly transmitted comprises being configured to cause the beacon signals to be periodically transmitted in accordance with the beacon transmission interval.

4. The apparatus according to claim 1 wherein the processing circuitry is further configured to receive a cellular signal directing that the device-to-device connection be established.

5. The apparatus according to claim 1 wherein the processing circuitry being configured to cause the device-to-device connection to be established comprises being configured to cause either a non-cellular device-to-device connection or a cellular device-to-device connection to be established.

6. The apparatus according to claim 1 wherein the processing circuitry being configured to cause the device-to-device connection to be established comprises being configured to cause a machine-to-machine connection to be established between a machine type communication (MTC) gateway and a MTC device.

7. A method comprising:
   receiving cellular signals including one or more beacon transmission parameters and a beacon transmission status flag;
   determining that the beacon transmission status flag is set to authorize beacon transmissions;
   causing non-cellular beacon signals to be repeatedly transmitted in accordance with the one or more beacon transmission parameters and in response to determining that the beacon transmission status flag is set to authorize beacon transmissions; and
   causing a device-to-device connection to be established following transmission of the beacon signals.

8. The method according to claim 7 wherein receiving the beacon transmission parameters comprises receiving a beacon transmission interval and an identifier.

9. The method according to claim 8 wherein causing the beacon signals to be repeatedly transmitted comprises causing the beacon signals to be periodically transmitted in accordance with the beacon transmission interval.

10. The method according to claim 7 further comprising receiving a cellular signal directing that the device-to-device connection be established.

11. The method according to claim 7 wherein at least one of:
    causing the device-to-device connection to be established comprises causing either a non cellular device-to-device connection or a cellular device-to-device connection to be established, and
    causing the device-to-device connection to be established comprises causing a machine-to-machine connection to be established between a machine type communication (MTC) gateway and a MTC device.

12. An apparatus comprising processing circuitry configured at least to;
    receive cellular signals including one or more beacon transmission parameters and a beacon measurement status flag;
    determine that the beacon measurement status flag is set to authorize beacon measurements;
    receive one or more non-cellular beacon signals;
    cause a cellular signal to be provided based upon a power level of the one or more non-cellular beacon signals; and
    cause a device-to-device connection to be established following provision of the cellular signal based upon the power level of the beacon signals.

13. The apparatus according to claim 12 wherein at least one of;
    the processing circuitry being configured to receive the beacon transmission parameters comprises being configured to receive a beacon transmission interval and an identifier of one or more first terminals that are configured to transmit non-cellular beacon signals;
    the processing circuitry being configured to receive the one or more non-cellular beacon signals comprises being configured to receive the non-cellular beacon signals in a periodic manner based upon the beacon transmission interval;
    the processing circuitry being configured to cause a cellular signal to be provided based upon the power level of the one or more non-cellular beacon signals comprises being configured to cause a cellular signal to be provided that includes one or more of an identity of a first terminal providing the non-cellular beacon signals, a power level of the non-cellular beacon signals or a link quality of the non-cellular beacon signals;
    the processing circuitry is further configured to receive a cellular signal requesting that information regarding the power level of the one or more non-cellular beacon signals be provided;
    the processing circuitry is further configured to receive a cellular signal directing that the device-to-device connection be established;
    the processing circuitry being configured to cause the device-to-device connection to be established comprises being configured to cause either a non-cellular device-to-device connection or a cellular device-to-device connection to be established; and
    the processing circuitry being configured to cause the device-to-device connection to be established comprises being configured to cause a machine-to-machine connection to be established between a machine type communication (MTC) gateway and a MTC device.

14. A method comprising:
    receiving cellular signals including one or more beacon transmission parameters and a beacon measurement status flag;

determining that the beacon measurement status flag is set to authorize beacon measurements;
receiving one or more non-cellular beacon signals;
causing a cellular signal to be provided based upon a power level of the one or more non-cellular beacon signals; and
causing a device-to-device connection to be established following provision of the cellular signal based upon the power level of the beacon signals.

15. The method according to claim 14 wherein receiving the beacon transmission parameters comprises receiving a beacon transmission interval and an identifier of one or more first terminals that are configured to transmit non-cellular beacon signals.

16. The method according to claim 15 wherein receiving the one or more non-cellular beacon signals comprises receiving the non-cellular beacon signals in a periodic manner based upon the beacon transmission interval.

17. The method according to claim 14 wherein causing a cellular signal to be provided based upon the power level of the one or more non-cellular beacon signals comprises causing a cellular signal to be provided that includes one or more of an identity of a first terminal providing the non-cellular beacon signals, a power level of the non-cellular beacon signals or a link quality of the non-cellular beacon signals.

18. The method according to claim 14 further comprising receiving a cellular signal requesting that information regarding the power level of the one or more non-cellular beacon signals be provided.

19. The method according to claim 14 further comprising receiving a cellular signal directing that the device-to-device connection be established.

20. The method according to claim 14 wherein causing the device-to-device connection to be established comprises causing either a non-cellular device-to-device connection or a cellular device-to-device connection to be established.

21. The method according to claim 14 wherein causing the device-to-device connection to be established comprises causing a machine-to-machine connection to be established between a machine type communication (MTC) gateway and a MTC device.

22. An apparatus comprising processing circuitry configured to at least:
cause one or more beacon transmission parameters and a beacon transmission status flag to be provided to one or more first terminals;
cause one or more beacon transmission parameters and a beacon measurement status flag to be provided to one or more second terminals;
receive a signal based upon the power level of beacon signals transmitted between the one or more first terminals and a respective second terminal; and
direct a device-to-device, connection to be established between a respective first terminal and the respective second terminal based upon the power level of the beacon signals.

23. The apparatus according to claim 22 wherein at least one of:
the processing circuitry being configured to cause one or more beacon transmission parameters to be provided to one or more first terminals comprises being configured to cause a beacon transmission interval and an identifier of a respective first terminal to be provided to the respective first terminal;
the processing circuitry being configured to cause one or more beacon transmission parameters to be provided to one or more second terminals comprises being configured to cause a beacon transmission interval and an identifier of a respective first terminal to be provided to the one or more second terminals;
the processing circuitry is further configured to introduce a predefined delay between causing the beacon transmission status flag to be provided to the one or more first terminals and causing the beacon measurement status flag to be provided to the one or more second terminals;
the processing circuitry is further configured to:
cause a request to be issued for the signal based upon the power level of the beacon signals from the respective second terminal; and
introduce a predefined delay between causing the beacon measurement status flag to be provided to the one or more second terminals and requesting the signal based upon the power level of the beacon signals; and
the processing circuitry being configured to direct the device-to-device connection to be established comprises being configured to direct either a non-cellular device-to-device connection or a cellular device-to-device connection to be established.

* * * * *